United States Patent [19]
Eisele

[11] Patent Number: 5,732,558
[45] Date of Patent: Mar. 31, 1998

[54] CONTROLLED ATMOSPHERE SYSTEM

[76] Inventor: Hugh Eisele, 8620 SE. 347th Ave., Boring, Oreg. 97009

[21] Appl. No.: 786,163

[22] Filed: Jan. 21, 1997

Related U.S. Application Data

[63] Continuation-in-part of Ser. No. 758,187, Nov. 25, 1996.

[51] Int. Cl.$^6$ .................................................. F24F 3/16
[52] U.S. Cl. ................... 62/78; 62/237; 62/384
[58] Field of Search ........................... 62/78, 65, 237, 62/239, 384

[56] References Cited

U.S. PATENT DOCUMENTS

| | | | |
|---|---|---|---|
| 4,566,282 | 1/1986 | Knoblauch et al. | 62/78 |
| 4,644,754 | 2/1987 | Gibot | 62/78 |
| 4,833,892 | 5/1989 | Wassibauer et al. | 62/78 |
| 5,249,428 | 10/1993 | Barbe | 62/78 |
| 5,457,963 | 10/1995 | Cahill-Obrien et al. | 62/78 |

*Primary Examiner*—Ronald C. Capossela
*Attorney, Agent, or Firm*—Chernoff, Vilhauer, McClung & Stenzel

[57] ABSTRACT

A controlled atmosphere system comprising a plurality of open-ended chambers within an enclosure that may be refrigerated, each chamber provided with a detach-able closure either in the form of a flexible curtain or a solid lightweight partition wherein each chamber is supplied with its own controlled atmosphere.

11 Claims, 3 Drawing Sheets

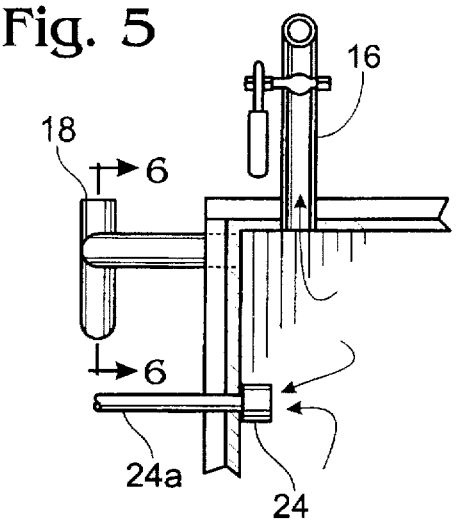
Fig. 5
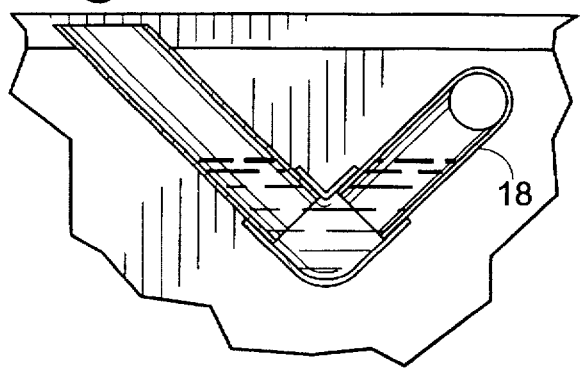
Fig. 6
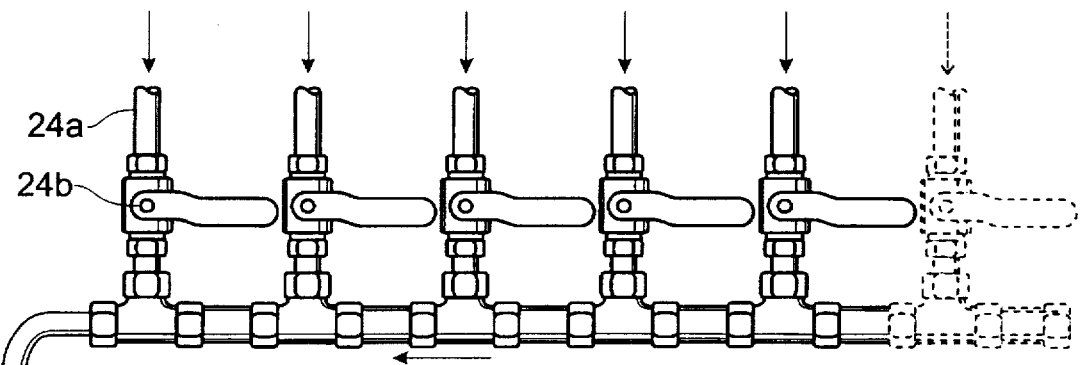
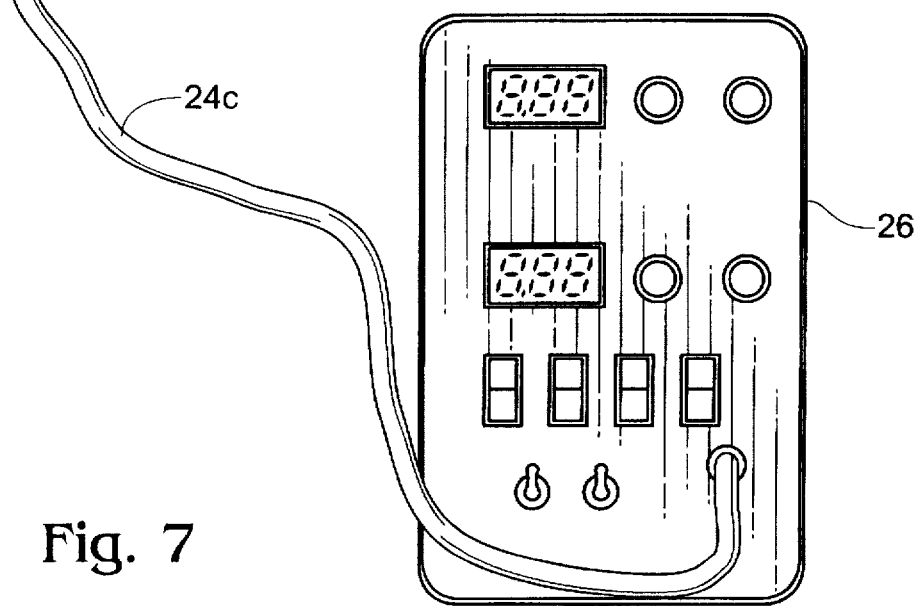
Fig. 7

CONTROLLED ATMOSPHERE SYSTEM

This is a continuation-in-part of application Ser. No. 08/758,187, filed Nov. 25, 1996

BACKGROUND OF THE INVENTION

It is well known to provide refrigeration and/or controlled atmospheres to maintain the freshness of perishable agricultural products, such as fruits, vegetables and flowers during storing or shipping of the same. In this connection, it is also well known that it is desirable to avoid freezing the products to prevent damage and deterioration, and that a large number of perishable products may be maintained in fresher condition at above-freezing refrigerated temperatures when they are also maintained in a low oxygen/high carbon dioxide content atmosphere, which is known to be less conducive to rapid ripening and spoilage. The maintenance of such a controlled atmosphere typically requires an air-tight seal of a refrigerated enclosure, which necessarily limits access to the agricultural products during storage and transport. It is also known to utilize a controlled atmosphere to store hardware such as guns or machinery.

BRIEF SUMMARY OF THE INVENTION

The essence of the present invention comprises the provision of a multiplicity of open-ended chambers within an enclosure which may or may not be refrigerated, the chambers being of sufficient size to accommodate one or more pallets bearing standard-sized containers such as produce containers wherein each chamber is further provided with detachable closure means capable of either covering the open end of the chamber or dividing the chamber into discrete zones or reducing the size of the chamber and with a means for gas circulation and appropriate hardware to receive and maintain a controlled atmosphere from a controlled atmosphere supply. When used for the storage of produce, the chambers are preferably within a refrigerated enclosure.

BRIEF DESCRIPTION OF THE SEVERAL VIEWS OF THE DRAWING

FIG. 5 is a cross-sectional detailed view of that portion of FIG. 4 designated as 5.

FIG. 6 is a cross-sectional view of element 18 of FIG. 5 taken along the plane 6—6.

FIG. 7 is an illustration of a portion of an exemplary combination gas monitoring and control system.

DETAILED DESCRIPTION OF THE INVENTION

Figure 1:
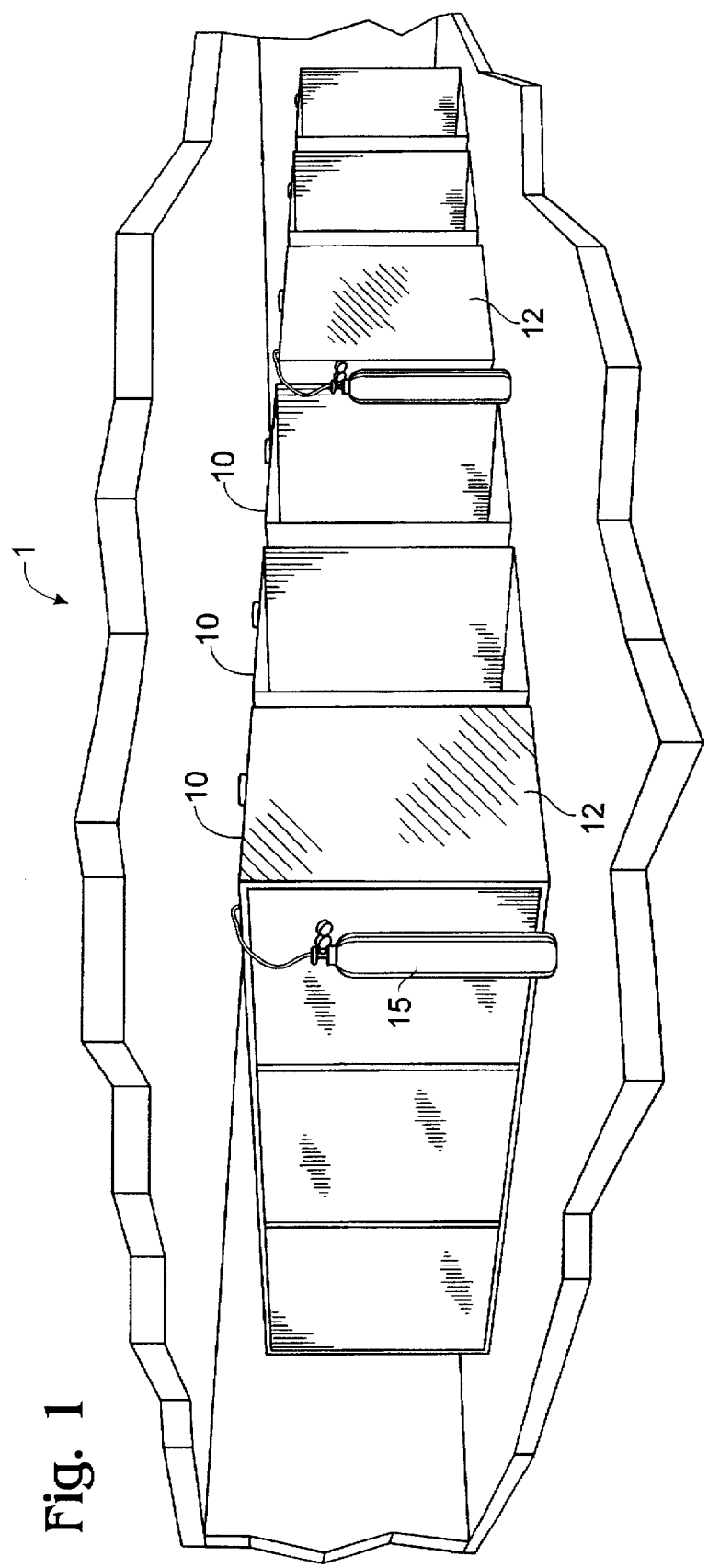
FIG. 1 is a perspective overview of the controlled atmosphere container system of the present invention, showing a plurality of individual open-ended chambers within a refrigerated enclosure.

According to the present invention, there is provided a controlled atmosphere container system comprising:

(a) a plurality of individual open-ended rigid chambers within an enclosure, each chamber being sized so as to accommodate at least one pallet having a standard-sized container thereon; and (b) means to supply a controlled atmosphere to each chamber.

Each chamber is built of a rigid gas-impermeable material such as sheet metal, fiberglass, thermosetting polymer or even wood with a sealant applied thereto; in a preferred embodiment, the material is 14 ga. steel. To receive the controlled atmosphere and to maintain the same, each chamber is provided with removable or detachable closure means such as a flexible curtain or a lightweight partition capable of covering the open end of the chamber and reducing the effective size of the chamber, an inert gas inlet, a pressure relief valve, exhaust means, gas circulating means and gas composition testing means. Such an arrangement allows storage of a wide variety of agricultural and hardware products having different controlled atmosphere composition requirements for storage and/or shipment, allows far more flexible access to the stored items without concern for breaking the controlled atmosphere seal, and at the same time minimizes the volumetric flow requirements for the supply and maintenance of a controlled atmosphere. In the case of stored produce, a wide variety of produce having different controlled atmosphere requirements may be stored in the same refrigerated enclosure while permitting access to selected produce without risk of spoilage of other stored produce.

In an especially preferred embodiment, the detachable closure means is substantially gas-impermeable plastic sheeting, sail cloth-grade ripstock nylon, treated canvas or a plexiglass sheet that may be sealed either to the open end of the chamber or to the sides, top and bottom of the chamber at some point inward of the open end so as to reduce the effective size of the chamber. The detachable closure is also preferably transparent so as to allow observation of the condition of the produce therethrough, although non-transparent material such as plywood or even light gauge steel will function as well. The detachable closure may be supported by a lightweight rigid frame of, e.g., wood, PVC, ABS, aluminum, or other lightweight metal or alloy, or it may be unsupported. Because the detachable closure is not a permanent structure, the same may simply be disposed of when it becomes worn or soiled.

To supply each chamber with a controlled atmosphere, each chamber is provided with an inert gas inlet that is fed by a source of one or more inert gases, the source preferably being valved. Typically, such inert gases include nitrogen, argon, carbon dioxide and ethylene, with nitrogen being used for flushing the chamber to rid it of atmospheric air and carbon dioxide, the latter being used in the case of produce storage to supply the bulk of the controlled atmosphere. The inert gas inlet may be as simple as a slit or hole in the detachable closure means of sufficient size to receive a gas hose therethrough.

Flushing of the chamber takes place by securing the closure means to four walls of the chamber at a predetermined point, preferably sealing the same thereto by tape, opening the purge valve in the top of the chamber and flushing atmospheric air out with an inert gas such as nitrogen, then closing the purge valve and feeding the inert gas into the chamber until the chamber contains the desired controlled atmosphere composition, as indicated by gas composition testing means.

The chamber experiences variations in atmospheric pressure, which variations in turn produce fluctuations in the pressure of the controlled atmosphere within the chamber. These pressures are accommodated by an exhaust valve provided in the upper portion of the chamber which, for economy of installation, is preferably a simple water-filled trap that generally prevents the entry of atmospheric air into the chamber, yet allows the escape of controlled atmosphere gases upon a build-up in pressure of the same within the chamber.

To allow the perishable produce to be in contact with the controlled atmosphere, each chamber is provided with gas circulating means, which is preferably a fan inside the chamber and duct work outside the chamber.

Each chamber is also preferably provided with humidification and/or dehumidification means so as to allow an increase or a reduction in the humidity in the chamber, some of the humidity being caused by respiration when produce is stored. The humidification/dehumidification means is preferably within the duct work outside the chamber, and includes secondary gas circulation means such as a fan.

Each chamber is also preferably provided with a gas composition tester that is in fluid communication with a gas composition monitor and in further communication with a supply of inert gas, the arrangement acting in cooperation to allow precise monitoring and adjustment of the controlled atmosphere to suit the particular storage needs of the produce in the chamber.

Turning now to the drawings, wherein like numerals refer to the same elements, there is shown in FIG. 1 a perspective overview of the controlled atmosphere container system of the present invention, showing a plurality of individual open-ended chambers 10 within a refrigerated enclosure 1, each chamber preferably being spaced apart from the adjacent chamber so as to permit circulation of refrigerated air between the chambers. Each chamber 10 is sized so as to accommodate a single layer of a number of pallets having standard-sized containers such as produce containers on the pallets, and also so as to accommodate a standard-sized lift truck of the type used in moving goods in warehouses, or a manually operated pallet lift or a person. Preferably, the dimensions of each chamber are: from 5 to 8 feet in height; multiples of 48 inches in length; and multiples of 48–52 inches in width. When the system is used in a refrigerated enclosure 1, the enclosure may be of the type found in a warehouse, in a ship's cargo hold, in a truck, in a rail car or in a modular cargo container.

Each chamber 10 is provided with detachable closure means 12 such as a flexible curtain or a lightweight partition, the closure means being capable of being detachably attached to the four walls of the chamber so as to substantially seal the same against the intrusion of atmospheric air. In a preferred embodiment, the removable closure means 12 is transparent or translucent flexible or rigid plastic or nylon sheeting that is capable of being sealed to the chamber 10 simply by taping the same to the four walls of the open chamber. In an especially preferred embodiment, the removable closure means 12 comprises substantially gas-impermeable sail cloth-grade ripstock nylon mounted on a lightweight rigid frame. In the case of produce storage, transparency allows one to view the produce to ascertain whether any adverse conditions have developed, such as an infestation of insects, undue respiration as indicated, for example, by the build-up of condensation on the detachable closure 12, or spoilage. When the closure becomes unduly soiled or worn or torn, the same may simply be disposed of and replaced with a fresh detachable closure.

Figure 2:
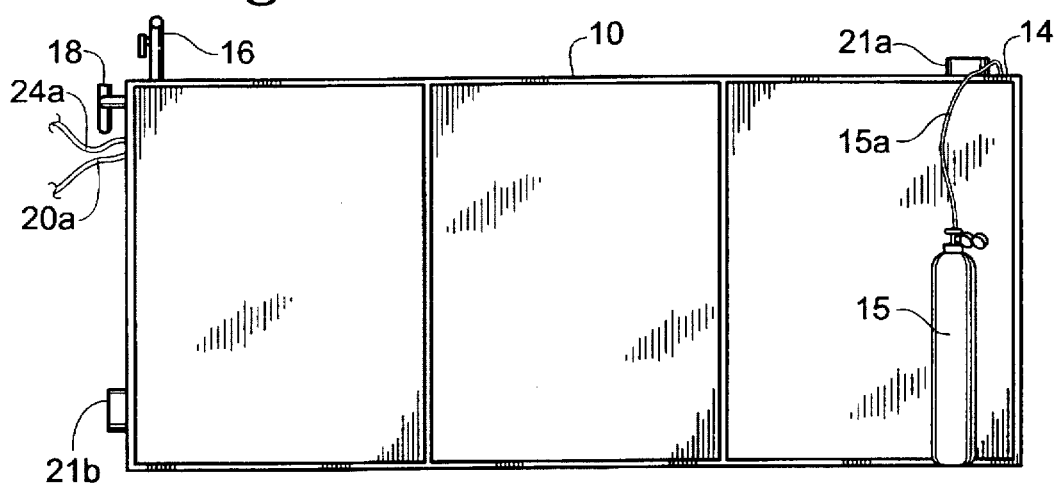
FIG. 2 is a side view of one of the open-ended chambers shown in FIG. 1.

In FIG. 2 there is shown a side view of one of the chambers 10, revealing an inert gas inlet 14, inert gas being supplied from an inert gas source such as a pressurized tank 15 and fed to inlet 14 via inert gas feed hose 15a. Alternatively, inert gas such as $CO_2$ may be supplied by warming liquid $CO_2$ to a gaseous state, accumulating and temporarily storing the gaseous $CO_2$ in a holding tank, then transforming a predetermined amount of the gaseous $CO_2$ to the chamber by an adjustable, timer-controlled valve. Such an automatic delivery system may be coupled with an adjustable, timer-controlled evacuation pump to evacuate the chamber prior to charging it with $CO_2$, and to shut down the evacuation pump during the $CO_2$-charging cycle. Such a system is described in U.S. Pat. No. 4,843,956, the details of which are incorporated herein. The inert gas inlet may also be nothing more than a slit or a hole, sealable with tape, in detachable closure 12, as shown in 12a of FIG. 4, sufficient in size to accommodate a gas hose from the inert gas supply. Typical inert gases used in the storage of agricultural produce such as fruit, nuts, vegetables and flowers include carbon dioxide, ethylene, nitrogen and argon, with carbon dioxide being the inert gas in most widespread use. Chamber 10 is provided with a purge valve 16 so as to allow flushing of atmospheric air from the chamber, valve 16 simply being opened when the chamber is being purged of atmospheric air and closed when the chamber is substantially purged. Proper storage of most agricultural produce calls for the presence of a minor amount of air, on the order of 0.05 to 20 vol %. In order to achieve such a composition, atmospheric air may be allowed to reenter the chamber merely by opening purge valve 16. Alternatively, pure oxygen from an oxygen source (not shown) may be supplied via gas inlet 14.

Because the interior of chamber 10 will experience fluctuations in pressure depending upon atmospheric pressure, each chamber is provided with exhaust means 18 to allow the escape of gas upon a build-up of pressure within the chamber. Preferably the exhaust means 18 is a simple trap, best seen in FIGS. 5 and 6, the trap being filled with a liquid such as water to form a seal so as to both prevent the entry of atmospheric air into chamber 10 and to prevent escape of the controlled atmosphere other than as is necessary to prevent an undue pressure reduction or build-up within the chamber.

Figure 4:
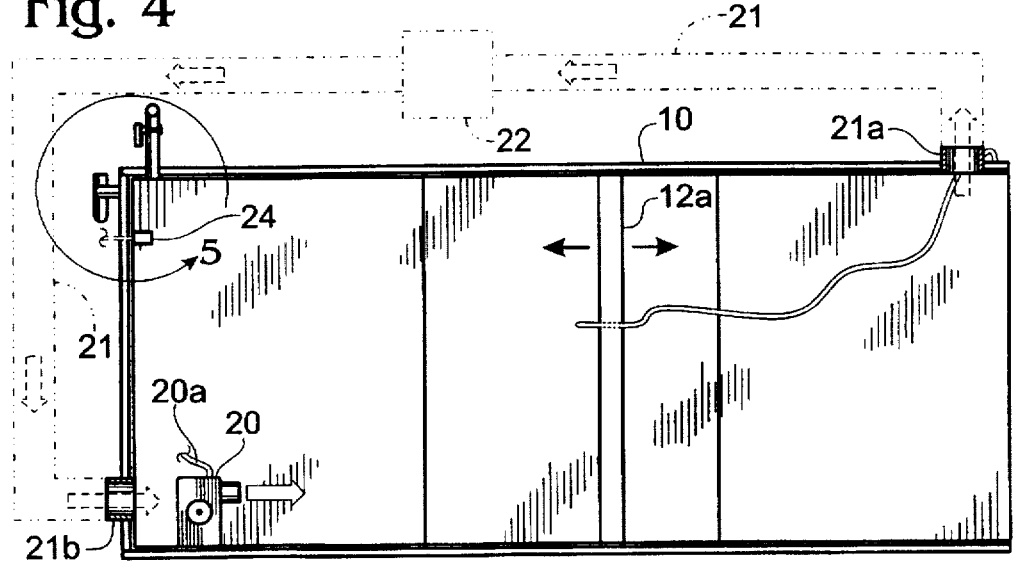
FIG. 4 is a cross-sectional view of FIG. 3 taken along the plane 4—4.

As seen in FIG. 4, each chamber 10 is provided with gas circulating means 20, which is preferably a blower of some sort such as a fan. To further promote circulation of the controlled atmosphere within chamber 10, each chamber may also be provided with ducting 21, shown in phantom in FIG. 4, to provide a pathway for the circulation of the controlled atmosphere from the top of the chamber to the chamber's bottom via ports 21a and 21b. In the event no ducting 21 is used, as would be the case when little circulation of the controlled atmosphere is needed, ports 21a and 21b are closed to atmospheric air by the insertion of bungs (not shown). When ducting 21 is used, in order to prevent the build-up of water vapor, ducting 21 may be provided with dehumidification means 22, preferably comprising a desiccant bed. Alternatively, humidification means (also designated 22) may be provided as necessary to maintain the proper level of humidity, the humidification means preferably comprising a swap cooler or a mister. When a chamber is provided with either humidification or dehumidification means 22, the chamber is also preferably provided with secondary gas circulating means 22a, such as a fan.

In order to periodically test the composition of the controlled atmosphere within chamber 10, the chamber is preferably provided with gas composition testing means, comprising in combination a gas composition sampler 24 connected to a gas analyzer 26 through sampler line 24a through valve 24b and gas analyzer line 24c. When a sample of the controlled atmosphere is desired to be taken and analyzed, valve 24b is opened, a vacuum is drawn by gas analyzer 26 upon line 24c and a sample is thereby drawn into analyzer 26 and analyzed to ascertain its precise make-up. An especially preferred gas analyzer is one commercially available from Pacific Ca Systems of Yakima, Wash. To the extent the controlled atmosphere requires more inert gas, the same may be either manually or automatically supplied from pressurized tank 15. In the event that makeup gas is supplied automatically, gas analyzer 26 is in electronic communication with a servovalve (not shown) by means of a computerized controller (not shown) in inert gas supply line 15a, whereby the controller, in response to an electronic signal from the gas analyzer that the concentration of inert gas in chamber 10 has fallen below a predetermined concentration, releases inert gas into the chamber. As seen in FIG. 7, each chamber 10 may be provided with its own gas composition testing means, with each sample line being in fluid communication with a common manifold feeding gas analyzer supply line 24c.

The system of the present invention is useable for the storage and transportation of all manner of goods, and is particularly well-suited for agricultural produce, including fruits, nuts, vegetables, mushrooms and flowers, and is capable of maintaining controlled atmospheres of widely varying compositions of from as little as 0.05 vol % oxygen to as high as 20 vol % and from as little as 0.04 vol % carbon dioxide to as high as 99.9 vol %. A good tabulation of the composition of controlled atmospheres for storage of various types of produce is found in "Proceedings of the Fourth National Controlled Atmosphere Research Conference," Jul. 23–26, 1985, North Carolina State University, Raleigh, N.C. In addition, the system of the present invention is capable of maintaining multi-component controlled atmospheres, simply by the addition of multiple inert gas inlet ports.

EXAMPLE

Figure 3:
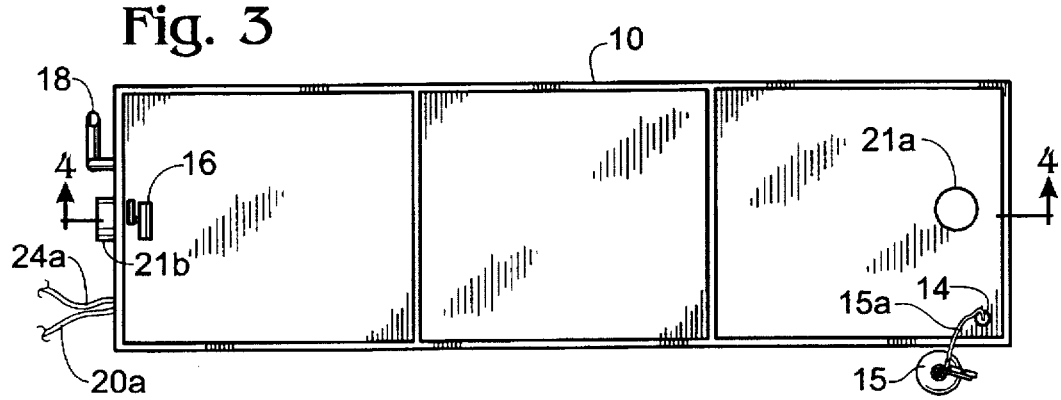
FIG. 3 is a top view of one of the open-ended chambers.

Freshly harvested blueberries containing about 1% unripe green berries and red berries were cleaned, sorted, graded and packaged the same day into 6 oz. hallocks placed in crates which were then loaded onto 6 standard-sized pallets, each measuring 40×wide×48" long×72" in height. Each pallet was then precooled to 32° F. and placed into a controlled atmosphere chamber fabricated from 14 ga. steel and having substantially the same design shown in FIGS. 2–4, with six pallets to each chamber. The chambers were within a refrigerated warehouse enclosure maintained at 32° F.

The open end of each chamber was sealed with 6 -mil- thick clear polyethylene taped to the four walls of the chamber. Purge valve 16 was opened, and atmospheric air was flushed with nitrogen until the oxygen level reached 8 vol %. Carbon dioxide was then supplied via inert gas inlet 14 until its concentration reach 12 vol %. The carbon dioxide also reduced the oxygen concentration to 6 vol %. Interior fan 20 was turned on for slight gas circulation within the chamber. The temperature in the chambers stayed at 33–34° F.

The blueberries were so stored for a total of 45 days, with the atmosphere being monitored daily by analyzer 26. The fruit was reinspected upon opening the chambers and actually improved in overall grade due not only to the total absence of decay, mold, mildew and insect damage, but also to the ripening of 75% of the green and red berries.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A controlled atmosphere container system comprising:
   (a) an enclosure;
   (b) a plurality of individual open-ended rigid chambers within said enclosure, each chamber being sized so as to accommodate at least one pallet bearing a standard sized container wherein each chamber is further provided with
      (i) substantially gas-impermeable detachable closure means capable of closing the open end of said chamber and varying the size of said chamber,
      (ii) an inert gas inlet,
      (iii) a pressure relief valve,
      (iv) exhaust trap,
      (v) gas circulating means, and
      (vi) gas composition testing means; and
   (c) atmosphere control means to supply a controlled atmosphere to each chamber wherein said detachable closure means comprises a fabric supported by a lightweight frame.

2. The system of claim 1 wherein said fabric of said detachable closure means is ripstock nylon.

3. The system of claim 1 wherein said gas circulating means is a fan with associated ducting capable of circulating gases within said chamber.

4. The system of claim 1 including secondary gas circulating means and dehumidification means.

5. The system of claim 1 including secondary gas circulating means and humidification means.

6. The system of claim 1 wherein said inert gas is $CO_2$ and said atmosphere control means comprises a liquid $CO_2$ container containing liquid $CO_2$, a heater for converting said liquid $CO_2$ to gaseous $CO_2$, a storage vessel for accumulating and temporarily storing said gaseous $CO_2$, a adjustable, timer-controlled valve in fluid communication with said storage vessel and said chamber for charging a predetermined amount of said gaseous $CO_2$ to said chamber, an adjustable, timer-controlled evacuation pump for evacuating said chamber prior to charging the same with said gaseous $CO_2$, and electrical switching to prevent operation of said evacuation pump while said chamber is being charged.

7. The system of claims 1, 2 or 6 within a refrigerated enclosure.

8. A controlled atmosphere container system comprising:
   (a) a refrigerated enclosure;
   (b) a plurality of individual open-ended and free-standing chambers within said refrigerated enclosure, wherein each chamber is provided with
      (i) substantially gas-impermeable detachable closure means capable of closing the open end of said chamber and varying the size of said chamber,
      (ii) an inert gas inlet,
      (iii) a pressure relief valve,
      (iv) exhaust trap,
      (v) gas circulating means, and
      (vi) gas composition testing means; and
   (c) atmosphere control means to supply a controlled atmosphere to each chamber wherein said detachable closure means is selected from the group consisting of a flexible curtain and a lightweight partition.

9. The system of claim 8 wherein said detachable closure means is plastic sheeting.

10. The system of claim 8 wherein said detachable closure means is treated canvas.

11. The system of claim 8 wherein said detachable closure means is selected from the group consisting of plexiglass, plywood and light gauge steel.

* * * * *

UNITED STATES PATENT AND TRADEMARK OFFICE
CERTIFICATE OF CORRECTION

PATENT NO. : 5,732,558
DATED : March 31, 1998
INVENTOR(S) : Hugh Eisele

It is certified that error appears in the above-indentified patent and that said Letters Patent is hereby corrected as shown below:

Col. 6, line 11 and line 50: insert -- an -- before "exhaust trap"

Col. 6, line 30: delete "a" before "adjustable" and insert -- an --

Signed and Sealed this

Twentieth Day of March, 2001

Attest:

NICHOLAS P. GODICI

Attesting Officer     Acting Director of the United States Patent and Trademark Office